United States Patent [19]
Trutzschler

[11] 3,859,066
[45] Jan. 7, 1975

[54] DUST FILTER

[75] Inventor: Hermann Trutzschler, Rheydt-Odenkirchen, Germany

[73] Assignee: Trutzschler & Co., Rheydt-Odenkirchen, Germany

[22] Filed: Sept. 20, 1973

[21] Appl. No.: 398,997

[30] Foreign Application Priority Data
Sept. 20, 1972 Germany............................ 2246171

[52] U.S. Cl............................ 55/401, 55/403, 55/429
[51] Int. Cl............................................... B01d 46/22
[58] Field of Search............................ 55/351–354, 55/400–405, 422, 429, 285, 290

[56] References Cited
UNITED STATES PATENTS

| | | | |
|---|---|---|---|
| 1,849,649 | 3/1932 | Wallace | 55/351 X |
| 2,167,283 | 7/1939 | Nutting | 55/353 X |
| 2,232,561 | 2/1941 | Richards | 55/353 X |
| 3,552,098 | 1/1971 | Cochran | 55/351 X |
| 3,744,450 | 7/1973 | Hardy | 55/351 X |

Primary Examiner—Frank W. Lutter
Assistant Examiner—William Cuchlinski, Jr.
Attorney, Agent, or Firm—Holman & Stern

[57] ABSTRACT

A dust filter comprising a plurality of filter plates arranged at equal distances from each other and being adapted to be moved through a channel transversally to the cross section of said channel. Said channel has an inlet for dust laden air, an outlet for the cleaned air and a length between said inlet and outlet of a multiple of one of said distances.

13 Claims, 2 Drawing Figures

DUST FILTER

BACKGROUND OF THE INVENTION

In known dust filters the dust laden air flow is transmitted to a filter cartridge or element such as a slowly rotating sieve drum and the known efficiency utilized so that a filtering surface already coated with dust acts as a finer filter. However, since by this method, which necessarily depends on intermittantly cleaning of part of the filtering surface, this surface is repeatedly exposed, without a dust coat, to the dust laden air flow, the produced air cannot be prevented from containing fine dust particles. Thus in order to filter out these dust particles still present in the air flow, it is common practice to provide the filter with a post-filtering element such as a hose to be periodically beaten or a post-filter drum.

SUMMARY OF THE INVENTION

The objective of the invention is to provide a filter having a very simple design and drive mechanism, cleans itself in continuous operation and requires no additional filter element.

The invention achieves this objective in that a dust filter comprises a plurality of filter plates arranged at equal distances from each other and is adapted to be moved through a channel transversally to the cross section of said channel, said channel having an inlet for dust laden air, an outlet for the cleaned air and a length between said inlet and outlet of a multiple of one of said distances. During part of its movement through the channel the filter plates divide the part of the channel communicating with the inlet into sections through which the air flows consecutively. The device ensures that the dust laden air is constantly flowing in the channel successively through several filter plates already coated with dust, and intensive, continuous cleaning of the dust laden air is therefore obtained.

The filter plates may be arranged radially, for example, on a drive shaft, or on several drive shafts running parallel to each other, or on an endless rotatable belt. Preferably this arrangement is such that the filter plates can be pivoted on the belt facing the elastic element and that on the end of the housing facing the dust laden air inlet a guide is provided for the filter plates which turns them towards the belt to face the elastic element and retains them in this swivel position. The elements supporting the filter plates are preferably driven periodically as soon as the air pressure at a point in the channel exceeds a predetermined value as a result of the filter plates becoming coated with dust.

DESCRIPTION OF THE DRAWING

In the drawings, like character references designate like parts throughout the several views wherein.

DESCRIPTION OF PREFERRED EMBODIMENTS

Figure 1:
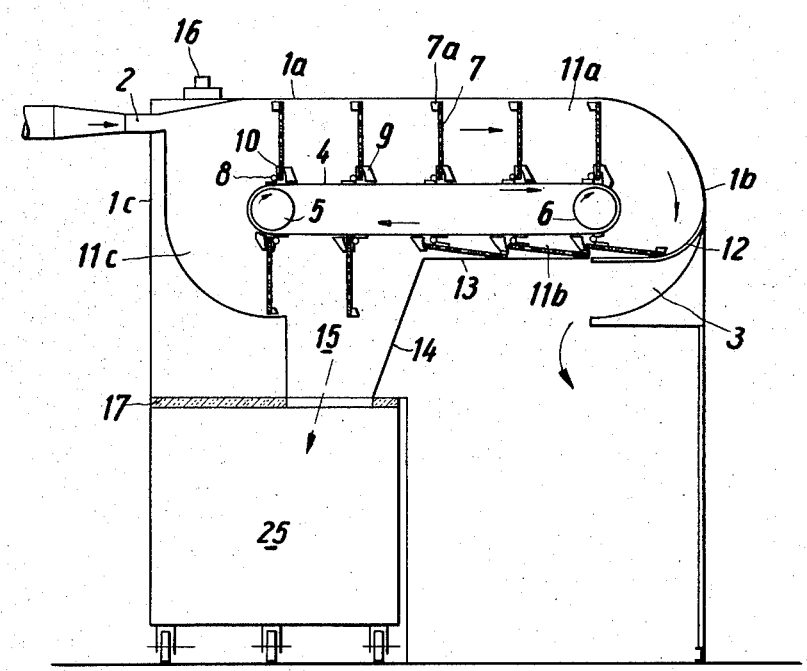
FIG. 1 is a side elevational view in section of the filter plate mounted on the endless belt located in the channel according to the present invention.

The drawing shows four design examples of the invention in longitudinal section.

In the design form shown in FIG. 1, two horizontal rollers 5 and 6 running parallel to each other are carried in bearings in a housing 1, which has an horizontal top 1a. One of these rollers is provided with a drive mechanism. Rollers 5 and 6 are surrounded by an endless belt 4 to which several filter plates 7 are fastened by means of a swivel joint 8 at equal intervals. On belt 4 a stop cam 9 is fitted on one side of each joint 8 and a helical spring 10 fitted on the axis of the joint 8, the spring being pressed by the filter plate 7 against the cam 9 into a position at right angles to belt 4. The top 1a of the housing and the upper end of belt 4 therefore form a channel 11a which is divided by a number of filter plates 7 into several adjacent partitioned sections.

At one end, level with channel 11a, the housing is provided with an inlet 2 for the dust-laden air. On the end of the housing opposite this inlet 2, and connected to the top 1a of the housing, is a semi-cylindrical part 1b which surrounds the roller 6 concentrically. Below the air inlet 2 the housing runs into a wall 1c, which is concentric to the roller 5, and which at its end forms the limit of an outlet 15 for the dust falling from the filter plates 7. The fall of the dust is limited on the opposite side by an oblique wall 14 communicating with an horizontal wall 13. The wall 13 is provided with guide bridges 12 at its outer end. The wall 13 and the guide bridges 12 are separated by such a short distance from the lower end of the belt 4 that the filter plates 7 are pivoted by the guide bridges 12 towards spring 10 into such a position that they form a small vertical angle to the horizontal. They are retained in this position by wall 13. As soon as a filter plate 7 leaves the wall 13 at its outer end due to the rotation belt 4, it is jerked into the position at right angle to belt 4 by spring 8. In doing so, the dust adhering to it falls down into the dust outlet 15 already mentioned.

Below the dust outlet 15 is a container 25 designed as a carriage which can remove from the housing 1. The upper end of the carriage 25 is sealed from the housing by a rubber seal 17 so that it is open to the dust outlet 15. The dust-free air excapes from the air outlet 3.

Each filter plate 7 supports at its outer end a sealing strip 7a facing the air inlet 2. This prevents dust from being blown off the plate 7 as the plate 7 swings into the air outlet 3.

The filter plates 7 therefore pass through channel 11a in the direction of the air flow, then through the narrow channel 11b between the wall 13 and the lower end of belt 4, and finally through the housing section 11c located between housing section 1c below roller 5. From housing section 11c the plates re-enter channel 11a. When passing through the channel 11b formed by the lower end of belt 4 and wall 13, rail 7a rests on cam 9 so that together they seal channel 11b.

Figure 2:
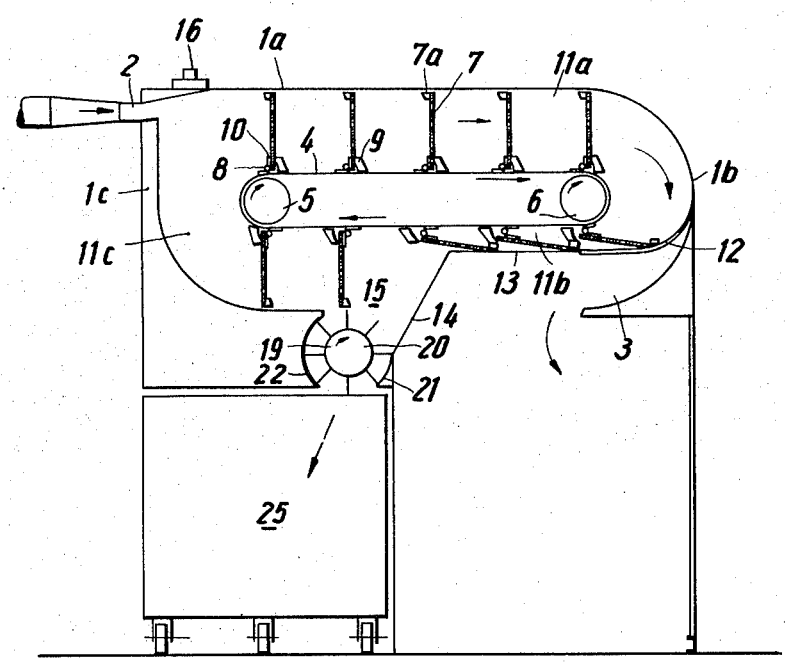
FIG. 2 is another embodyment of the apparatus according to the present invention.

In the design example according to FIG. 2, which in all other respects tallies with FIG. 1, an air lock is provided for sealing container 25 from air inlet 2 and air outlet 3. The air lock consists of a cell wheel 19 pivoted around a horizontal axis and arranged in the dust outlet 15. The radial walls 20 of the cell wheel 19 abut so that they are air-tight on cylindrical walls 21 and 22 which communicate with walls 1c and 14 respectively.

Figure 3:
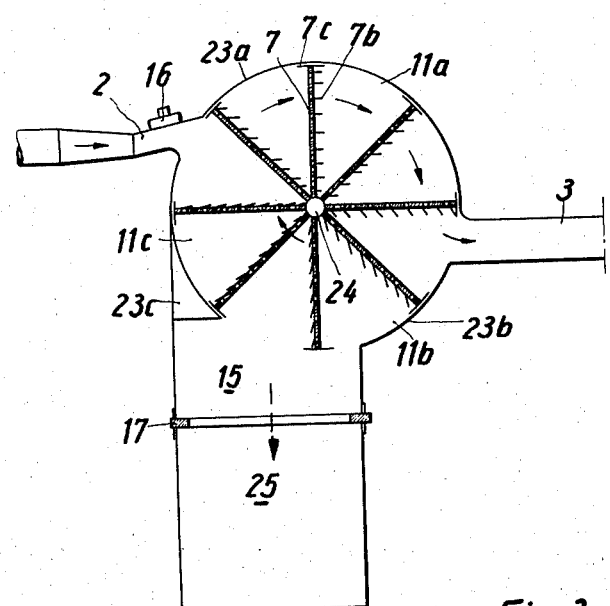
FIG. 3 is a different embodiment of the apparatus employing a rotary shaft.

In the design example according to FIG. 3, filter plates 7 are secured to a rotary shaft 24, which rotates in the direction of the arrow in the housing 23a, 23b, 23c concentric to the shaft 24. The dust-laden air admitted through an inlet 2 flows through channel 11a bounded by the upper part (top) 23a of the housing, and flows out of air outlet 3 as cleaned air. The dust falls from the filter plates 7 through the dust outlet 15 underneath shaft 24 into the dust container 25, which is sealed from the housing by a rubber seal 17. Filter plates 7 are provided on their sides facing away from air inlet 2, with discs 7b, which are raised by the filter plates through the air flow when the discs 7b are located in channel 11a. When the discs are located in section 11c of the channel bounded by housing section 23c, they are pressed by the air on to the filter plates so that they do not allow any air through. Discs 7b may be designed so that they rest against the filter with the minimum of elastic force, so that they are opened only by a sufficiently high air pressure and are therefore also closed in the wall section 11b bounded by housing section 23b.

Figure 4:
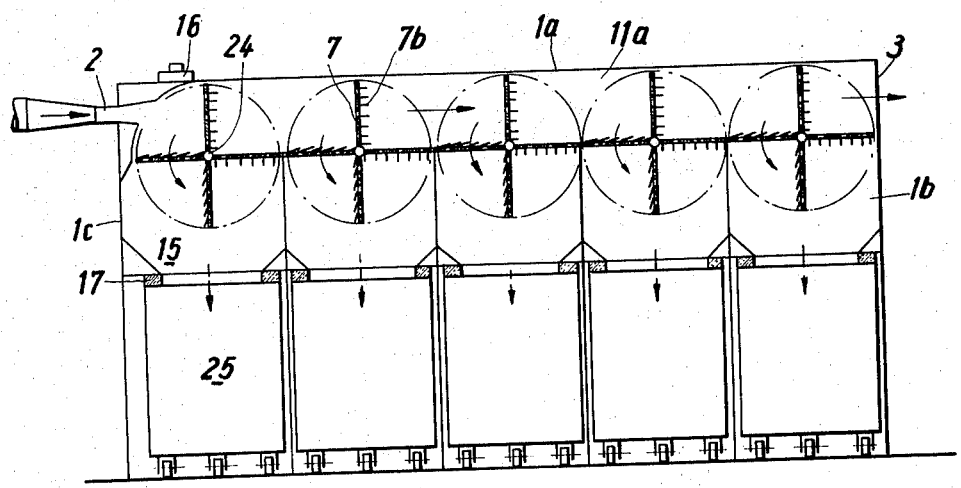
FIG. 4 is another embodiment of the apparatus of FIG. 3 employing a plurality of shafts.

In the design example according to FIG. 4, several shafts 24 with filter plates 7 are arranged consecutively in a horizontal channel 11a, which at one has an inlet 2 for the dust-laden air and at the other an outlet 3 for the dust-removed air, a carriage 25, sealed from housing 1a, 1b, 1c by a sealing ring 17, being provided as a dust container.

In each of the design examples according to the invention, part of the dust is deposited on that plate 7 lying nearest air inlet 2. However, the air flowing through this plate 7 still contains a dust residue. This is deposited for the most part on the next plate 7. Any dust also being forced through this plate 7 is deposited on the next plate 7 or the plate following that. The dust filter according to the invention requires no additional filter element of any other kind.

The longer plate 7 next the air inlet is exposed to the dust-laden air, the more its air permeability is reduced by the coat of dist on it and the higher the air pressure becomes in the channel section 11a between the plate and the air inlet 2. Belt 4 or shafts 24 are preferably only driven when this air pressure exceeds a predetermined value for the atmospheric pressure, for example 50 mm column of water. Consequently filter plates come to rest for a certain time after they have been moved so far that one filter plate 7 is moved out of channel section 11c into channel section 11a, and are only moved on when so much dust has been deposited on this plate that the air pressure between the plate and the air inlet 2 has increased to the predetermined minimum value.

To control the drive, a switch 16 is actuated by the air pressure is provided in the direction flow behind the air outlet 2. The switch is connected to a device, which is not shown, for controlling a drive motor for roller 6 or for shafts 24.

I claim:

1. A dust filter comprising, in combination:
   a. a housing forming a channel having an inlet for dustladen air and outlet for the cleaned air and a constant cross section between said inlet and said outlet
   b. an air-impermeable endless belt;
   c. means for moving said belt through the channel of the housing, the movement being transverse to a cross section of the channel;
   d. a plurality of filter plates arranged at equal distances from each other on the belt, each filter plate having only a form that a projection of the plate on a plane of the cross section of the channel is in conformity with the cross section so that the plates seal the channel against the housing and against the belt, the length of said channel between said inlet and said outlet being longer than a multiple of one of said distances.

2. A dust filter according to claim 1, in which the end of the filter plate supports a sealing strip.

3. A dust filter according to claim 2, in which the height of the filter plates is by the breadth of the sealing strip greater than a distance of two filter plates from each other.

4. A dust filter according to claim 1, in which each filter plate is pivotable about an axis transversally to said belt and a guide is provided on that end of the housing which is opposite to the inlet end for the dust-laden air, said guide being adapted to swing the plates to the belt against the force of an elastic element, and retain the plates in this position.

5. A dust filter according to claim 4, in which an abutment is provided on the belt for each filter plate for limiting the swing of the filter plates effected by the elastic element.

6. A dust filter according to claim 5, in which the height of the filter plates is so much greater than the distances of the filter plates that the sealing strip of a filter plate rests against the abutment of the following filter plate so that it acts as a seal when the filter plates are swung by the guides towards the belt.

7. A dust filter according to claim 6, in which a dust charging lock is provided in the dust outlet of the housing.

8. A dust filter according to claim 7, in which a switch actuated by the air pressure is provided in the section of the channel adjacent to the air inlet and is connected to a device for switching on and off the device setting the filter plates in circulation.

9. A dust filter according to claim 1, in which the filter plates are arranged radially on a drive shaft and channel has the shape of a circular arc sector.

10. A dust filter according to claim 9, in which a plurality of these devices consisting of drive shaft and filter plates are arranged consecutively in a channel section, which at one end has a dust-laden air inlet and at the other end the clean air outlet.

11. A dust filter according to claim 10, in which the filter plates support discs on their rear side which in the closed position overlap each other and which are adapted to be brought to their opening position by the air flow.

12. A dust filter according to claim 11, in which a container is arranged for removing dust from the housing of the dust filter by receiving dust fallen from the filter plates, the container being sealed from the housing.

13. A dust filter according to claim 12, in which said container is a carriage adapted to be removed from the housing.

* * * * *